(12) United States Patent  
Niezur et al.

(10) Patent No.: US 7,841,647 B2  
(45) Date of Patent: Nov. 30, 2010

(54) BAFFLE ASSEMBLY

(75) Inventors: Michael C. Niezur, Madison Heights, MI (US); Robert B. Davis, Macomb, MI (US)

(73) Assignee: Sika Technology AG, Baar (CH)

( * ) Notice: Subject to any disclaimer, the term of this patent is extended or adjusted under 35 U.S.C. 154(b) by 784 days.

(21) Appl. No.: 11/745,176

(22) Filed: May 7, 2007

(65) Prior Publication Data

US 2008/0110694 A1     May 15, 2008

Related U.S. Application Data

(60) Provisional application No. 60/859,167, filed on Nov. 15, 2006.

(51) Int. Cl.
*B62D 29/00* (2006.01)
(52) U.S. Cl. .................. 296/187.05; 296/39.3; 52/404.1
(58) Field of Classification Search ............... 296/39.3, 296/187.02; 52/717.03, 404.1, 232
See application file for complete search history.

(56) References Cited

U.S. PATENT DOCUMENTS

| | | | |
|---|---|---|---|
| 4,182,973 A | | 1/1980 | Vrijssen et al. |
| 5,506,025 A | * | 4/1996 | Otto et al. ............... 428/98 |
| 7,144,071 B2 | * | 12/2006 | Le Gall et al. ......... 296/187.02 |
| 2005/0212326 A1 | | 9/2005 | Marion |
| 2005/0268454 A1 | * | 12/2005 | White .......................... 29/592 |
| 2007/0018057 A1 | | 1/2007 | Kovac |

FOREIGN PATENT DOCUMENTS

| | | |
|---|---|---|
| EP | 1364862 A2 | 11/2003 |
| WO | WO-0134453 A1 | 5/2001 |
| WO | WO-0222387 A1 | 3/2002 |
| WO | WO-2005002950 A2 | 1/2005 |

OTHER PUBLICATIONS

International Search Report for PCT/EP2007/062376 dated Mar. 12, 1008.

* cited by examiner

*Primary Examiner*—Glenn Dayoan  
*Assistant Examiner*—Melissa A Black  
(74) *Attorney, Agent, or Firm*—Rader, Fishman & Grauer, PLLC

(57) ABSTRACT

A baffle assembly for engaging a panel and a method of manufacturing the same are disclosed. A baffle assembly may include at least two baffles, each having a rigid carrier and an expandable material, which are linked by a connecting member which allows each baffle to pivot about the connecting member. The baffles may each include an attachment member configured to engage a first aperture and a second aperture, respectively, in a panel. A method of manufacturing a carrier for engaging a panel may include forming at least two baffles, and forming a connecting member between the baffles that allows the baffles to pivot about the connecting member.

21 Claims, 7 Drawing Sheets

BAFFLE ASSEMBLY

CROSS-REFERENCE TO RELATED APPLICATIONS

This application claims priority based on U.S. Provisional Patent Application No. 60/859,167, filed Nov. 15, 2006, which is incorporated herein by reference in its entirety.

BACKGROUND

Baffles may be used to improve noise transmission qualities or seal interfaces of various structural assemblies, such as body assemblies for motor vehicles. Baffles typically include a rigid carrier having features for securing the baffle to a structural element, e.g., a sheetmetal panel. An expandable material may be provided on the carrier that may be expanded, such as by the application of heat, to form a material which improves structural qualities of any panels or structural members in contact with the expanded material. For example, the expanded material may become relatively stiff after formation, thereby improving overall strength and/or rigidity of a panel. Some expandable materials may form a foam material after expansion that dampens transmission of sound through the structure by absorbing sound energy or dampening vibrations of a structure. Baffles may additionally be used to form complex structures on or adjacent a structural element, e.g., a sheetmetal panel.

Baffles may be especially useful where it is necessary to provide features having shapes or configurations that would be difficult or impractical to manufacture using traditional methods, e.g., stamping or molding. For example, a baffle may have an expandable material which expands to form a mass which generally seals an interface between various structures, or directs fluid flow, e.g., drainage of water, within a body cavity. In some cases, several baffles may be provided within a single body cavity to create a channel within the cavity for routing fluid flow therein. As one example, two separate baffles may be installed on either side of a body cavity to generally define a passage for conducting water that may accumulate within the body cavity to a drainage aperture provided in one of the body panels.

For applications where more than one shape or feature is needed, such as to properly route fluid flow within a body cavity, multiple baffles are generally required in order to properly form each separate shape or feature. Each separate baffle requires a separate forming process and installation step, further increasing manufacturing costs. Further, a greater number of parts and manufacturing operations results in increased opportunities for manufacturing errors. For example, the individual baffles may look very similar, especially in the case of mirror-image "right hand side" and "left hand side" versions of a similar part, allowing an operator to be easily confused, and incorrectly install one or more baffles. A manufacturer may therefore realize increased warranty costs and customer complaints as a result of incorrect installations at the plant.

Accordingly, there is a need in the art for a baffle which can form a plurality of distinct shapes or features, to reduce the number of separate baffles that may need to be installed on a particular structure, e.g., a sheetmetal panel. Further, the baffle must also being cost-efficient to manufacture and install.

DETAILED DESCRIPTION

Various embodiments directed to a baffle assembly for engaging a panel and a method of manufacturing the same are disclosed herein. An exemplary embodiment of a baffle assembly includes at least two baffles, each having a rigid carrier and an expandable material, which are linked by a connecting member which allows each baffle to pivot about the connecting member. The baffles may each include an attachment member configured to engage a first aperture and a second aperture, respectively, in a panel. An exemplary method of manufacturing a carrier for engaging a panel includes forming at least two baffles, and forming a connecting member between the baffles that allows the first and second baffles to pivot about the connecting member.

Figure 1:
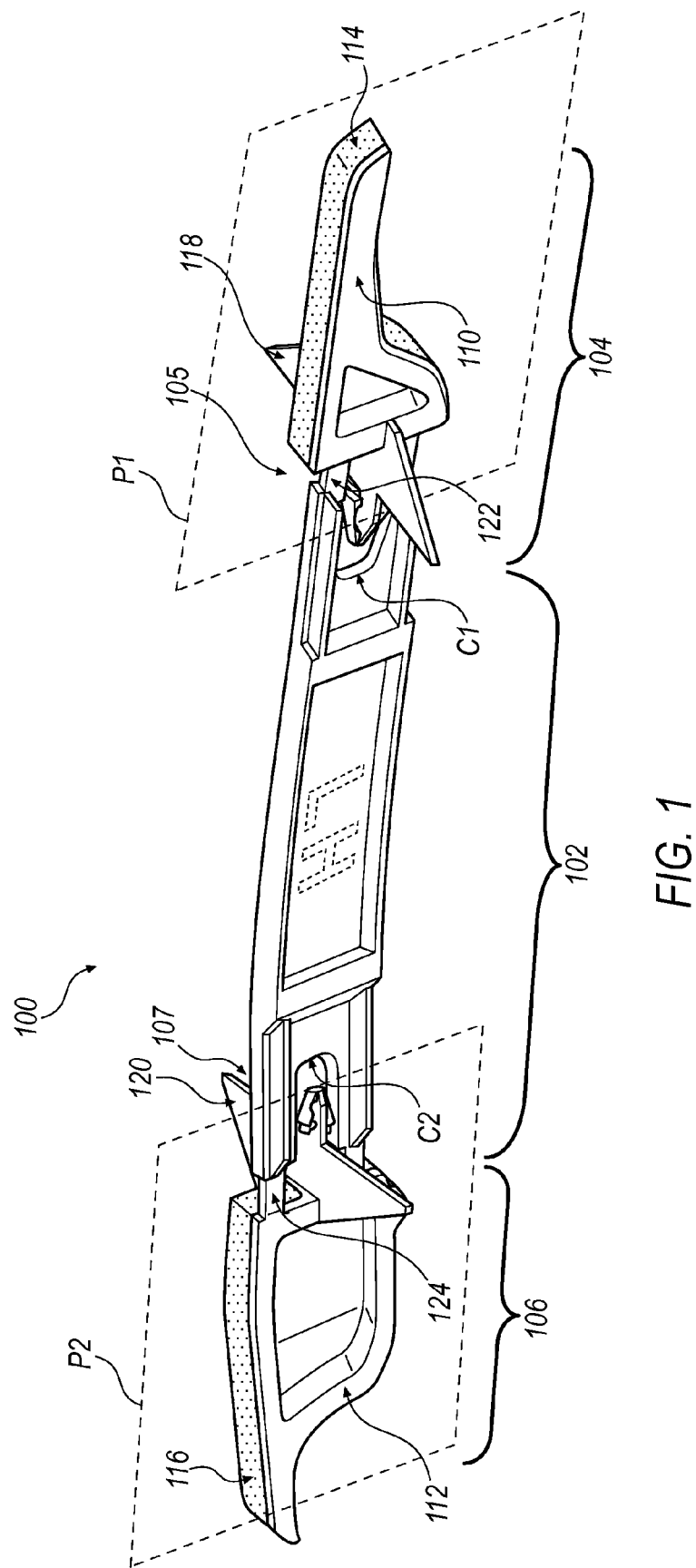
FIG. 1 is a perspective view of a baffle assembly, according to an embodiment.
Figure 2:
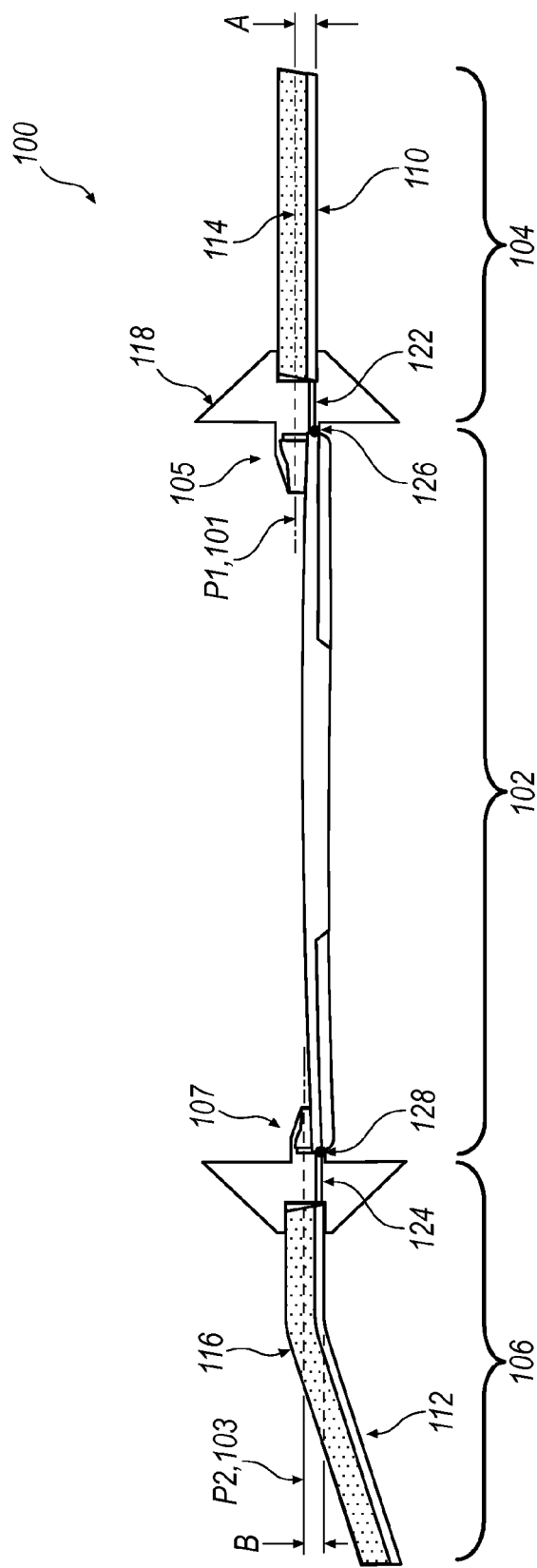
FIG. 2 is a top view of a baffle assembly, according to an embodiment.

Turning now to FIGS. 1 and 2, a baffle assembly 100 for engaging a panel is illustrated. Baffle assembly 100 generally includes a connecting member 102, a first baffle 104 disposed at a first end of connecting member 102, and a second baffle 106 disposed at a second end of connecting member 102. First and second baffles 104, 106 are joined to connecting member 102 with living hinges 122, 124, respectively, for pivoting about each end of connecting member 102. First and second baffles 104, 106 each include a rigid carrier portion 110, 112, respectively, and an expandable material 114, 116 formed on each of the rigid carrier portions 110, 112. First and second baffles 104, 106 each may further include first and second attachment members 105, 107 that are generally configured to engage apertures in a panel, as will be described further below.

Connecting member 102 is shown in the figures having a generally flat shape. Connecting member 102 generally positions each of first and second baffles 104, 106 for engagement with apertures defined by a panel. Other shapes and configurations of connecting member 102 may be employed, as may be convenient for positioning any number of baffles in relation to each other for engagement with apertures defined in a panel for various applications.

First and second baffles 104, 106 may generally be configured to form baffle materials for a particular application. First and second rigid carriers 110, 112 may each be generally flat, rigid structures for supporting an expandable baffle material 114, 116, respectively. Virtually any size or shape of first and second rigid carriers 110, 112 may be utilized in order to suit a particular application for baffle assembly 100. Further, expandable baffle materials 114, 116 may be disposed on each rigid carrier 110, 112 in any location, thickness, shape, etc., that is desirable for a particular application. For example, as shown in FIGS. 1-6, first and second baffles 104, 106 may be generally spaced from each other such that when they are pivoted about 90 degrees for engagement with apertures 204, 206 defined in a panel 202, and whereupon expandable materials 114, 116 are expanded, two separate baffle structures 114', 116' are formed on either side of a drainage aperture 302.

First and second baffles 104, 106 may be joined to opposing ends of connecting member 102 with a living hinge 122, 124, respectively. Living hinges 122, 124 may include at least one thin or relatively flexible member connecting first and second baffles 104, 106 to connecting member 102, thereby allowing first and second baffles 104, 106 to pivot about connecting member 102. Rigid carrier portions 110, 112 and living hinges 122, 124 are preferably formed integrally with connecting member 102, such as by injection molding, as further described below. Accordingly, rigid carrier portions 110, 112, living hinges 122, 124, and connecting member 102 may be conveniently formed in a single piece. Further, as will be described further below, expandable material 114, 116 may be formed on rigid carrier portions 110, 112 as a second step of a "two-shot" injection molding process, where rigid carriers 110, 112, living hinges 122, 124, and connecting member 102 are formed in a first step.

First and second attachment members 105, 107 may include any type of fastener for engaging complementary features in a panel. For example, as shown in FIGS. 1-4, first and second attachment members 105, 107 include a Christmas tree or rosebud-type fastener, as are generally known, configured to engage an appropriately sized aperture provided in a panel. Other configurations for first and second attachment members 105, 107 may be employed, and may include any known features for engaging complimentary features in a panel, including an aperture as shown in FIGS. 1-6, or other panel features such as a tab or stud formed in the panel. As shown in FIG. 2, first attachment member 105 has a longitudinal axis 101 that may be offset from a pivot point 126 of living hinge 122 by a predetermined distance A. Similarly, second attachment member 107 may have a longitudinal axis 103 that is offset from a pivot point 128 of living hinge 124 by a distance B. Offset distances A and B generally provides an errorproofing functionality, as will be further described below. First and second baffles 104, 106 may additionally include fins 118, 120 for engaging connecting member 102 to generally prevent pivoting of first and second baffles 104, 106 in a given direction, as described further below.

In addition to first and second baffles 104, 106, additional baffles may be provided as part of baffle assembly 100. For example, additional attachment members may be provided for any additional apertures on a panel with which baffle assembly 100 may be desirably engaged. Connecting member 102 may be shaped and sized accordingly to properly locate additional attachment members for engagement with a panel. Further, any rigid carriers and/or attachment members included as part of any additional baffles may be formed integrally with connecting member 102, similar to various features of first and second baffles 104, 106 that may be formed integrally with connecting member 102.

Figure 3:
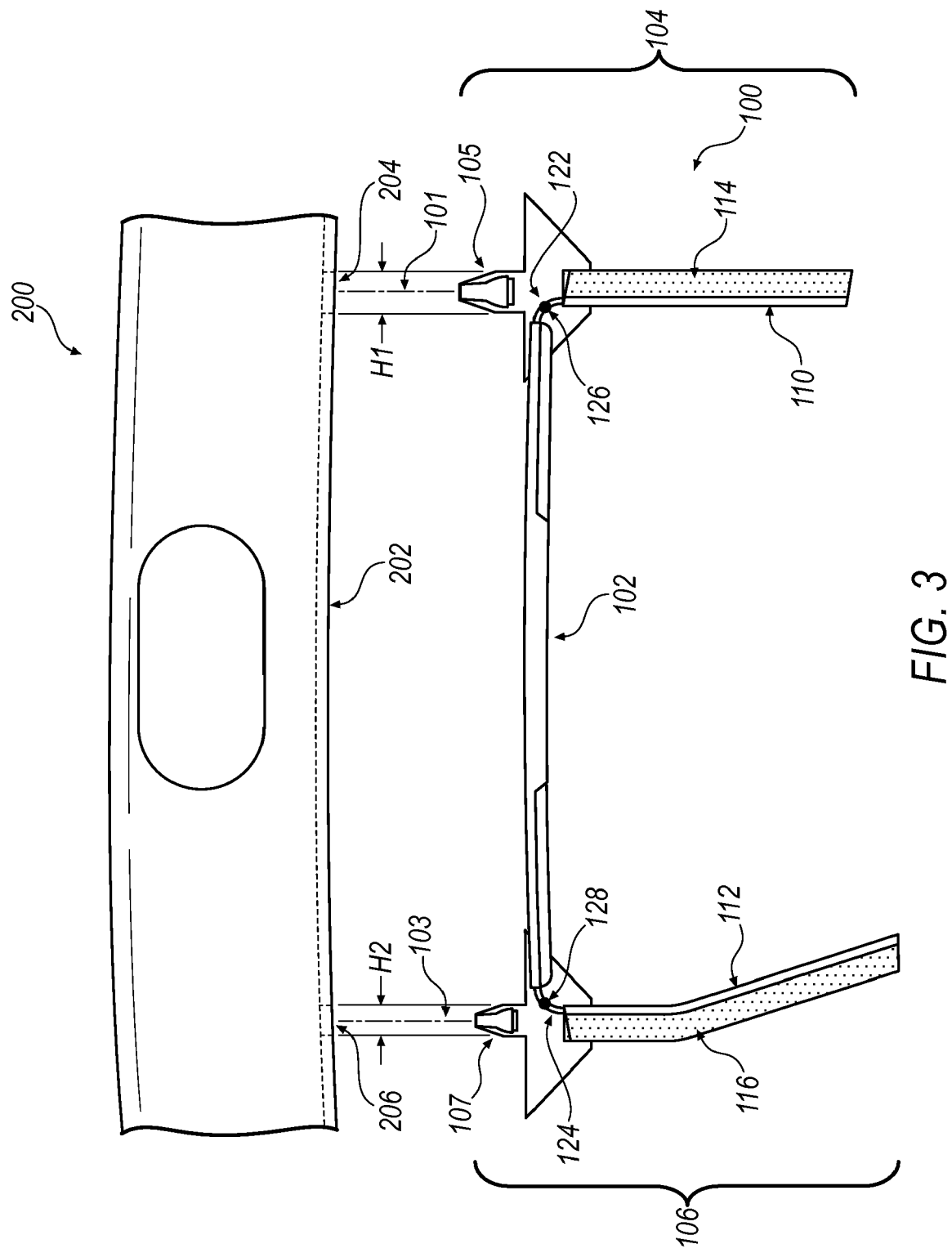
FIG. 3 is a top view of a baffle assembly positioned for engagement with a panel, according to an embodiment.
Figure 4:
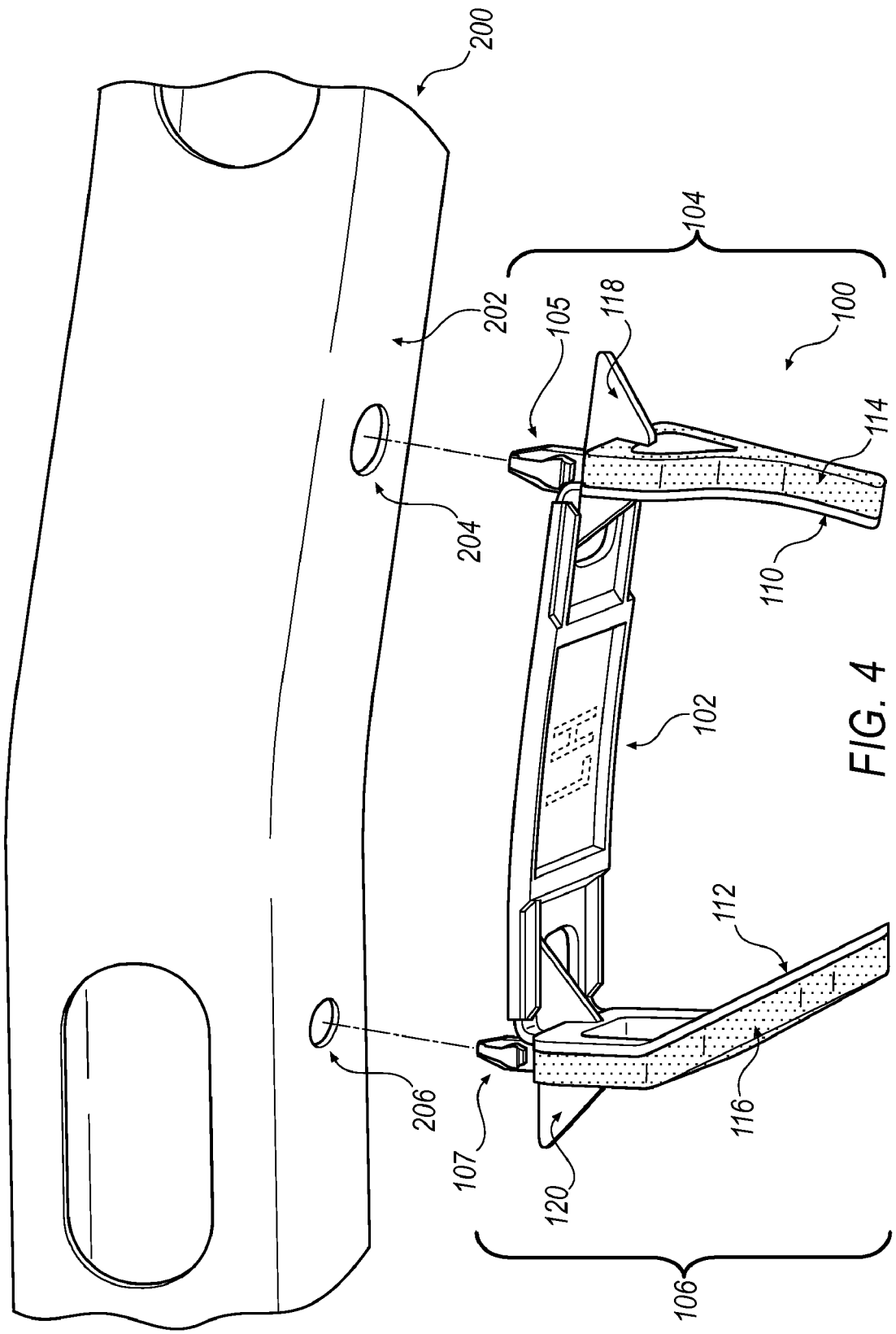
FIG. 4 is a top perspective view of a baffle assembly positioned for engagement with a panel, according to an embodiment.
Figure 5:
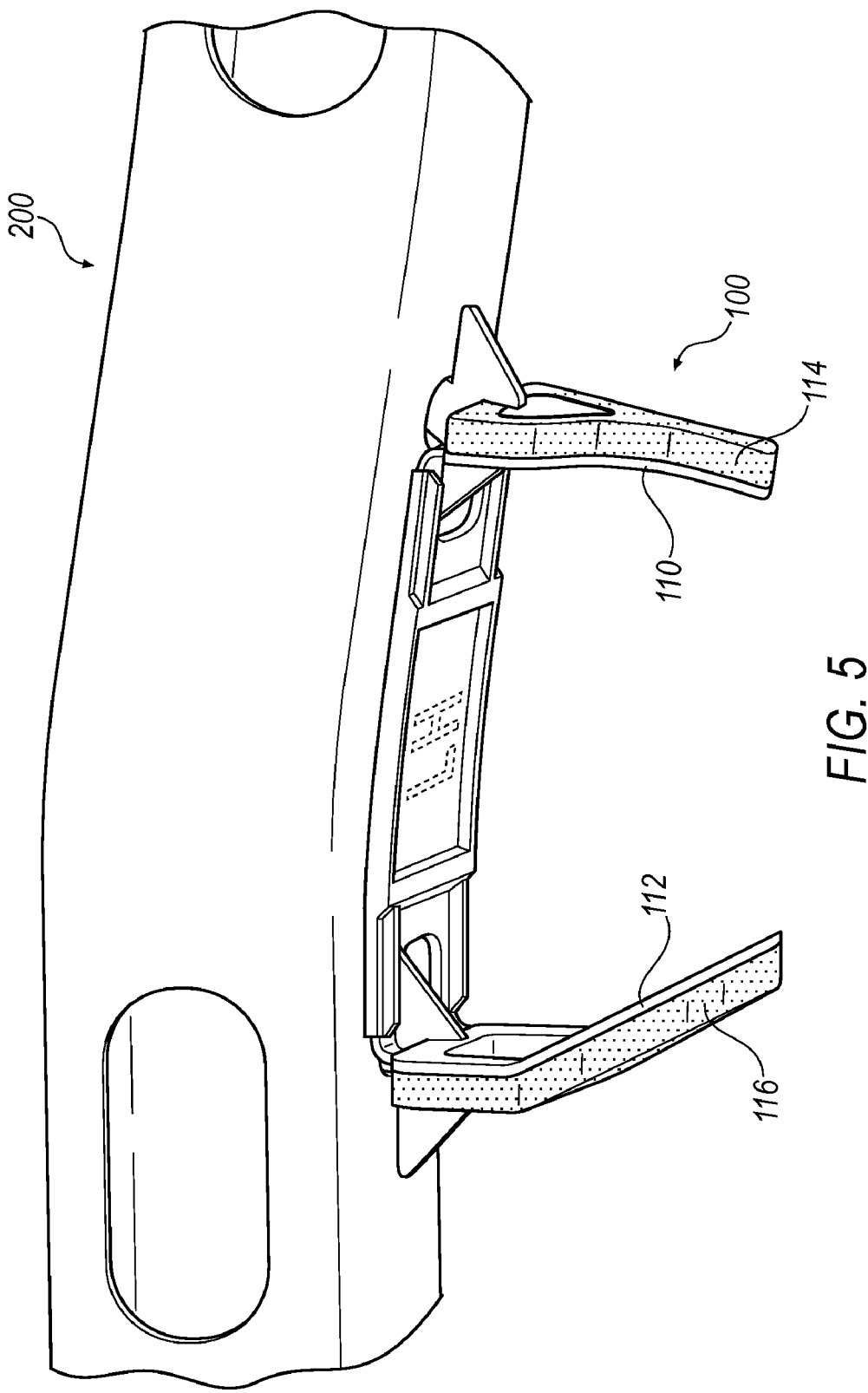
FIG. 5 is a top perspective view of a baffle assembly engaged with a panel; according to an embodiment.
Figure 6:
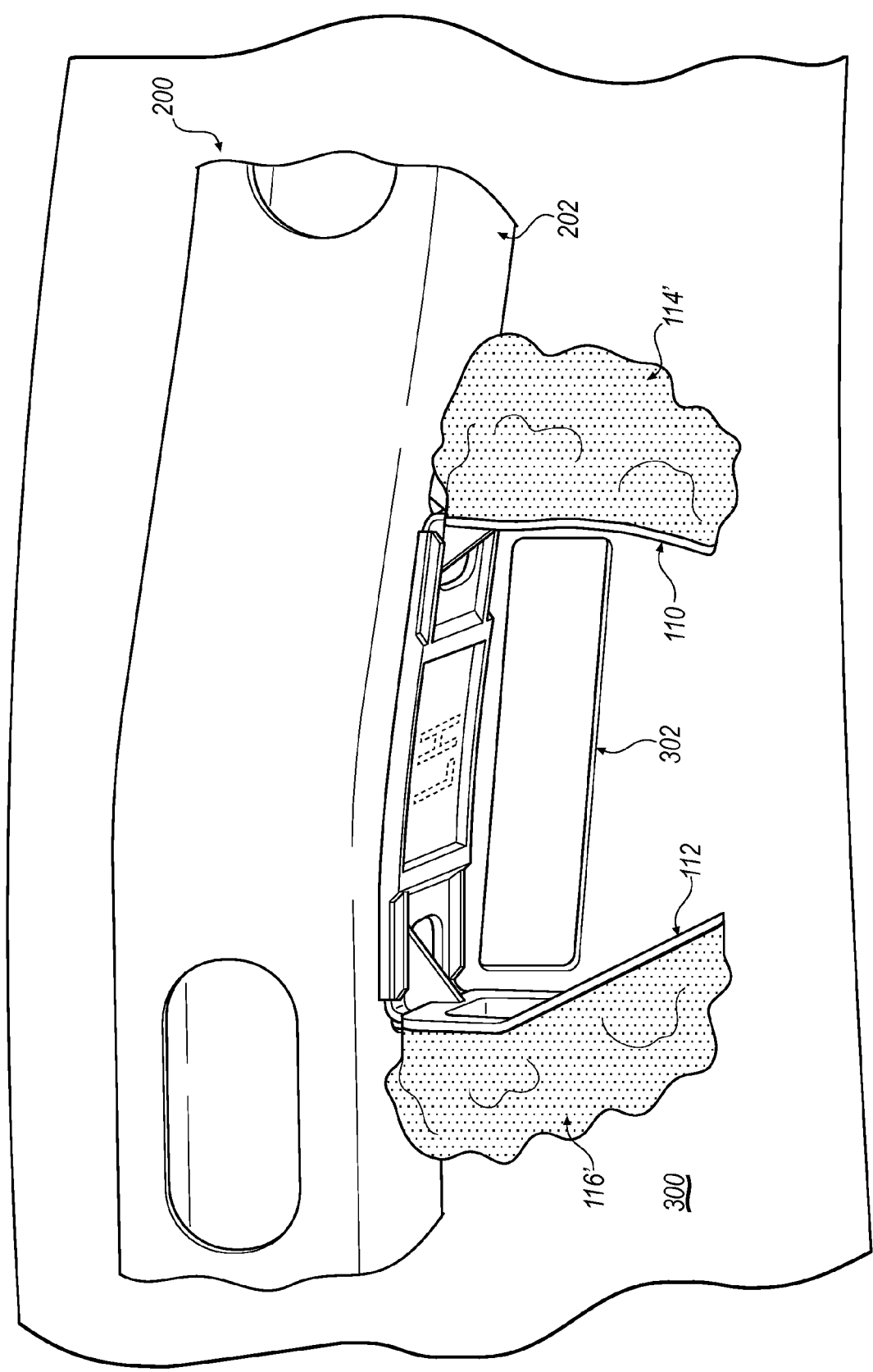
FIG. 6 is a top perspective view of a baffle assembly engaged with a panel after an expandable material included in the baffle assembly is expanded, according to an embodiment.

As shown in FIGS. 1 and 2, first and second baffles 104, 106 are in a first position. In the first position, longitudinal axis 101 of first attachment member 105 is generally disposed in a plane P1. Longitudinal axis 103 of second attachment member 107 is disposed in a second plane P2, which may be generally the same plane as P1, or be generally parallel to plane P1. Conveniently, baffle assembly 100, including connecting member 102 and first and second baffles 104, 106, may be integrally formed in the first position, e.g., by injection molding. Further, alignment of each longitudinal axis 101, 103 in a same plane P1, or in parallel planes P1 and P2, generally allows use of a relatively simple mold configuration for a molding process, e.g., injection molding. In FIGS. 3 and 4, first and second baffles 104, 106 are shown in a second position wherein each of first and second attachment members 105, 107 are pivoted about connecting member 102, and are thereby aligned for insertion into apertures 204, 206, respectively, of a panel 202. First and second baffles 104, 106 may pivot about pivot points 126, 128 by means of living hinges 122, 124 from the first position to the second position. Accordingly, first and second attachment members 105, 107 are properly aligned for engaging apertures 204, 206 disposed on a panel 202 of a structural member 200. The second position for first and second baffles 104, 106 may be oriented generally orthogonal to the first position of first and second baffles 104, 106, respectively. Once first and second attachment members 105, 107 are pivoted into the second position, baffle assembly may be secured to panel 202 by inserting first and second attachment members 105, 107 into apertures 204, 206, respectively. As shown in FIG. 5, baffle assembly 100 may thereby be secured to structural member 200. Accordingly, expandable materials 114, 116 are generally positioned to expand on opposite sides of connecting member 102 to form separate baffle features. For example, as shown in FIG. 6, expanded material 114' and 116' generally form opposing sides of a fluid drainage channel, which conducts fluid accumulating within a body cavity to a drainage aperture 302.

As briefly described above, fins 118, 120, may be provided on first and second baffles 104, 106, respectively, to generally prevent pivoting of first and second baffles 104, 106 in the wrong direction. For example, as shown in FIG. 1, fin 118 may be shaped to abut a contact point C1 of connecting member 102 when first baffle 104 is rotated, starting from the first position, in a direction away from the second position. Fin 118 may thereby generally prevent further movement of first baffle 104 away from the correct position. Similarly, fin 120 of second baffle 106 may be configured to abut a contact point C2 of connecting member 102 if second baffle 106 is rotated, starting from the first position, in a direction away from the second position. Accordingly, an operator will generally be prevented from pivoting first and second baffles 104, 106 in the wrong direction, thereby also preventing destruction of baffle assembly 100 due to a "forced" incorrect engagement between baffle assembly 100 and a panel.

As shown in FIGS. 1 and 2, offset distances A and B may be provided in addition to fins 118, 120 to improve the errorproofing function of fins 118, 120. Baffle assembly 100 may include an offset distance A between pivot point 126 and longitudinal axis 101 of first attachment member 105. Offset distance A may generally cooperate with fin 118 to ensure engagement of fin 118 with contact point C1 when first baffle 104 is pivoted incorrectly, and also ensure that fin 118 does not contact any part of connecting member 102 when pivoted correctly. Similarly, an offset distance B may be provided to ensure that fin 120 engages contact point C2 only when second baffle 106 is pivoted from the first position toward the second position, and not when second baffle 106 is pivoted (correctly) from the first position toward the second position. Offset distances A and B may thus generally prevent fins 118, 120 from interfering with the pivoting of first and second baffles 104, 106 in the proper direction.

As a further errorproofing feature, each of first and second attachment members 105, 107 may be have different diameters or sections that correspond to different diameters or sizes of apertures 204, 206 in panel 202. For example, as shown in FIG. 3, first attachment member 105 may be sized to fit an aperture having a diameter H1, and second attachment member 107 may be sized to fit an aperture having a diameter H2 which is smaller than H1. Accordingly, baffle assembly 100 is prevented from being installed "upside-down" to panel 202.

Conveniently, in embodiments where fins 118, 120 are provided in combination with attachment members 105, 107 which define different sizes, baffle assembly 100 will generally allow insertion to panel 202 only in the intended position. Fins 118, 120 generally prevent pivoting of first and second baffles 104, 106 in the wrong direction, while the different sizes of first and second attachment members 105, 107 prevent an "upside-down" installation of baffle assembly 100.

Figure 7:
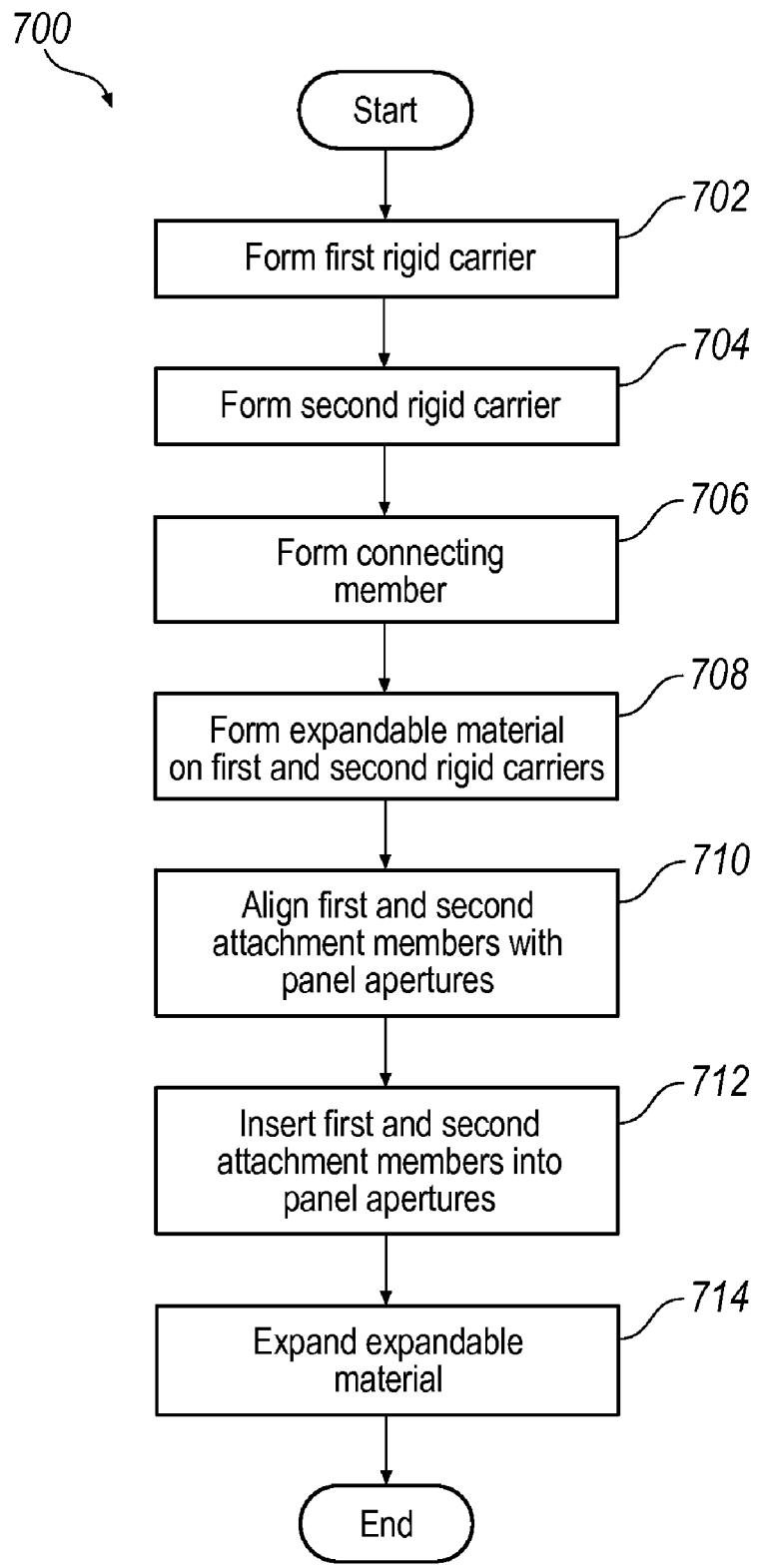
FIG. 7 is a process flow diagram for manufacturing a baffle assembly, according to an embodiment.

Turning now to FIG. 7, an exemplary process 700 for manufacturing and/or installing baffle assembly 100 to a panel 202 is illustrated. Process 700 may begin with step 702, where a first rigid carrier 110 may be formed. As described above, first rigid carrier 110 may be formed as part of first baffle 104, and include a first attachment member 105. First attachment member 105 may be a Christmas tree or rosebud-type fastener, as examples. In embodiments where connecting member 102 and first rigid carrier 110 are formed integrally, it may be desirable to configure first attachment member 105 for integral formation with first rigid carrier 110. Further, other features of first baffle 104, such as fin 118, may be formed integrally with first rigid carrier 110. Process 700 may then proceed to step 704.

In step 704, a second rigid carrier 112 may be formed. As described above, second rigid carrier 112 may include a second attachment member 107, which may be any known fastener for engaging a panel, such as a Christmas tree or rosebud-type fastener. Similar to first rigid carrier 110, second rigid carrier 112 is preferably integrally formed with connecting member 102 in an injection molding process. Further, other features of second baffle 106, such as fin 120, may be formed integrally with second rigid carrier 112. Process 700 may then proceed to step 706.

In step 706, connecting member 102 is formed. Connecting member 102 may be formed as part of an integral piece with other components of baffle assembly 100 described herein. For example, first and second rigid carriers 110, 112 may be integrally formed with connecting member 102. Preferably, first and second rigid carriers 110, 112 are integrally formed with connecting member 102 in an injection molding process, wherein connecting member 102, first rigid carrier 110, and second rigid carrier 112 are generally formed in a single step. First and second rigid carriers 110, 112 may be joined to connecting member 102 with living hinges 122, 124, as described above. Living hinges 122, 124 may themselves be integrally formed with connecting member 102 and/or first and second rigid carriers 110, 112, respectively.

Steps 702, 704, and 706 may include any manufacturing process that is convenient for forming various components of first and second baffles 104, 106, and connecting member 102. For example, as described above, many components of baffle assembly 100 may be injection-molded of a plastic or nylon material. Alternatively, casting or stamping processes may be employed to form various components of baffle assembly 100 from a metallic or otherwise malleable material. Further, other known methods may be employed to form components of baffle assembly 100. Process 700 may then proceed to step 708.

In step 708, an expandable material 114, 116 may be formed on baffle assembly 100, such as on first and second rigid carriers 110, 112. For example, a material which is expandable by the application of heat may be injection molded onto first and second rigid carriers 110, 112. In one embodiment, an expandable baffle material which expands to form a foam material upon the application of heat is injection molded onto first and second rigid carriers 110, 112 in a two-shot injection molding process following formation of connecting member 102 and first and second rigid carriers 110, 112. In at least one known embodiment, process 700 may then proceed to steps 710 through 714.

In step 710, first and second baffles 104, 106, may be rotated to align each of first and second attachment members 105, 107 with apertures in a panel, e.g., a sheetmetal panel or a panel of a structural member. For example, as described above, first and second attachment members 105, 107 may be aligned for insertion to apertures 204, 206, respectively, in panel 202 of structural member 200. As shown in FIGS. 3 and 4, each of first and second baffles 104, 106 are in the second position, such that each of first and second attachment members 105, 107 are aligned for engagement with apertures 204, 206. Process 700 may then proceed to step 712.

At step 712, first and second attachment members 105, 107, may be inserted into panel apertures 204, 206. First and second attachment members 105, 107, may be provided with features which positively engage apertures 204 and 206, such as the Christmas tree or rosebud-type fasteners shown in FIGS. 1-4. Accordingly, baffle assembly 100 may be installed to structural member 200 with each of first and second baffles 104, 106 in their second position, as shown in FIG. 5. Process 700 may then proceed to step 714.

In step 714, the expandable material may be expanded to form baffle structures 114', 116'. As shown in FIG. 6, baffle structures 114' and 116' generally abut a base surface 300 of a sheet metal panel that is secured to structural member 200. Accordingly, baffles 114', 116', structural member 200, and base surface 300 cooperate to form a channel or drainage passageway which communicates with drainage aperture 302 of base surface 300. Drainage aperture 302 may be located near a bottom portion of a cavity defined by base surface 300 and an opposing sheet metal panel (not shown), such that moisture, dirt, or other contaminants may drain out of the cavity. Process 700 may then terminate.

Accordingly, baffle assembly 100 may advantageously be formed in an efficient manufacturing process, such as injection molding connecting member 102 and various components of first and second baffles 104, 106, generally in a single step. Further, an expandable material may be provided on portions of baffle assembly 100, which may also be integrally formed with first and second rigid carriers 110, 112. Baffle assembly 100 may thereby be produced in a two-shot injection molding process, wherein connecting member 102 and first and second rigid carriers 110, 112 are formed in a first step, and expandable material 114, 116 is formed on first and second rigid carriers 110, 112 in a second step. Further, baffle assembly 100 may provide a plurality of separate baffles, e.g., first baffle 104 and second baffle 106, for a structure, e.g., structural member 200 or base surface 300, in a single part, thereby simplifying installation and reducing manufacturing costs. Although baffle assembly 100 has been described as having an expandable material 114, 116 which forms a drainage channel, any other type of expandable baffle material may be employed according to the needs of a particular application. For example, baffle assembly 100 may be provided with material that expands to increase structural rigidity, or dampen noise and/or vibration, of a panel or structural member.

Reference in the specification to "one embodiment" or "an embodiment" means that a particular feature, structure, or characteristic described in connection with the embodiment is included in at least one embodiment. The phrase "in one embodiment" in various places in the specification does not necessarily refer to the same embodiment each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A baffle assembly, comprising:
   at least a first baffles and a second baffle, each having a rigid carrier and an expandable material disposed thereon, said first and second baffles each having a respective attachment member configured to engage a first aperture and a second aperture, respectively, in a panel; and
   a connecting member positioned between said first and second baffles, wherein each of said first and second baffles are pivotally connected to said connecting member;
   wherein one of said first and second baffles includes a fin portion, said one of said first and second baffles pivotable in a first direction for engagement with the panel, said fin configured to engage said connecting member when said one of said first and second baffles is pivoted in a direction generally opposite said first direction.

2. The baffle assembly of claim 1, wherein said rigid carriers of each of said first and second rigid carriers are integrally formed with said connecting member.

3. The baffle assembly of claim 1, wherein each of said first and second rigid carriers are pivotally connected to said connecting member.

4. The baffle assembly of claim 1, further comprising a living hinge disposed between said connecting member and one of said rigid carriers of said first and second baffles, said living hinge allowing said at least one of said first and second baffles to pivot about said connecting member.

5. The baffle assembly of claim 4, wherein said living hinge includes a pivot point for said one of said first and second baffles, said pivot point offset from a longitudinal axis of said attachment member of said one of said first and second baffles.

6. The baffle assembly of claim 1, wherein said expandable material is configured to expand upon application of heat.

7. The baffle assembly of claim 1, wherein the panel is a vehicle structural member.

8. The baffle assembly of claim 1, wherein said first and second attachment members each include one of a rosebud-type fastener and a Christmas tree fastener.

9. The baffle assembly of claim 1, wherein said attachment members each define a longitudinal axis, said longitudinal axes defining a single plane.

10. The baffle assembly of claim 1, wherein said attachment members each define a longitudinal axis, said longitudinal axes each being disposed in a plane, said planes being generally parallel to each other.

11. A method of manufacturing a baffle assembly, comprising:
    forming at least a first baffle and a second baffle, including:
        forming a first rigid carrier and a second rigid carrier, said first and second rigid carriers each having a first and second attachment member, respectively, configured to engage first and second apertures of a panel; and
        forming an expandable material on said first and second rigid carriers;
    forming a connecting member between said first and second baffles, wherein each of said at least two rigid carriers are pivotally connected to said connecting member; and
    forming a fin portion on one of said first and second baffles, said one of said first and second baffles pivotable in a first direction for allowing said attachment member of said one of said first and second baffles to engage the panel, said fin portion configured to engage said connecting member when said one of said first and second baffles is pivoted in a direction generally opposite said first direction.

12. The method of claim 11, wherein said first and second rigid carriers are integrally formed with said connecting member.

13. The method of claim 11, wherein said first and second rigid carriers and said connecting member are formed in an injection molding process.

14. The method of claim 11, further comprising forming a living hinge between one of said first and second baffles and said connecting member, said living hinge allowing said one of said first and second baffles to pivot about said connecting member.

15. The method of claim 14, wherein a pivot point of said living hinge is offset from a longitudinal axis of said attachment member of said one of said first and second baffles.

16. The method of claim 11, further comprising applying heat to said expandable material, thereby expanding said expandable material.

17. The method of claim 11, wherein forming said attachment members includes forming one of a rosebud-type fastener and a Christmas tree fastener.

18. The method of claim 11, wherein said attachment members each define a longitudinal axis, said longitudinal axes defining a single plane.

19. The method of claim 11, wherein said attachment members each define a longitudinal axis, said longitudinal axes each being disposed in a plane, said planes being generally parallel to each other.

20. A method of installing a baffle to a base surface, comprising:
    providing a baffle assembly including at least a first baffle and a second baffle, said first and second baffles joined by a connecting member, each of said first and second baffles being pivotally connected with said connecting member, said first and second baffles including first and second attachment members, respectively, configured to engage apertures in the base surface, said first and second attachment members aligned in a first position;

forming a fin portion on one of said first and second baffles, said one of said first and second baffles pivotable in a first direction for allowing said attachment member of said one of said first and second baffles to engage the panel, said fin portion configured to engage said connecting member when said one of said first and second baffles is pivoted in a direction generally opposite said first direction;

pivoting said first and second attachment members to a second position to align said attachment members for engaging the first and second apertures, said second position oriented generally orthogonal to said first position; and inserting said attachment members into the first and second apertures.

21. The method of claim 20, further comprising;

establishing providing said baffle assembly as including:
   forming a first rigid carrier and a second rigid carrier; and
   forming an expandable material on said first and second rigid carriers; and expanding said expandable material to form at least two separate baffles disposed on the base surface.

* * * * *

UNITED STATES PATENT AND TRADEMARK OFFICE
CERTIFICATE OF CORRECTION

| | | |
|---|---|---|
| PATENT NO. | : 7,841,647 B2 | Page 1 of 1 |
| APPLICATION NO. | : 11/745176 | |
| DATED | : November 30, 2010 | |
| INVENTOR(S) | : Michael C. Niezur et al. | |

It is certified that error appears in the above-identified patent and that said Letters Patent is hereby corrected as shown below:

In the claims:

At column 7, claim number 1, line number 36, please change the word "baffles" to "baffle".

Signed and Sealed this
Third Day of May, 2011

David J. Kappos
*Director of the United States Patent and Trademark Office*